No. 842,703. PATENTED JAN. 29, 1907.
M. E. ROBERTS.
DISH DRAINER.
APPLICATION FILED AUG. 29, 1905.
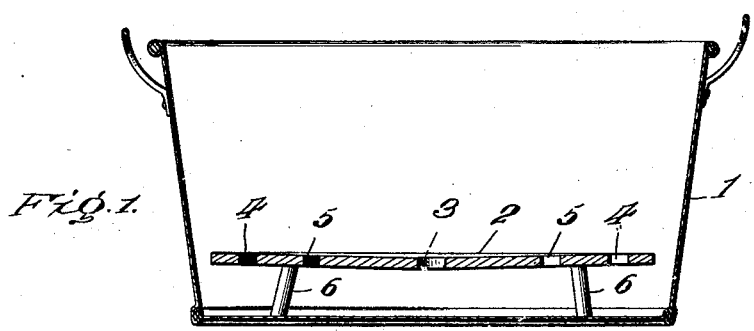
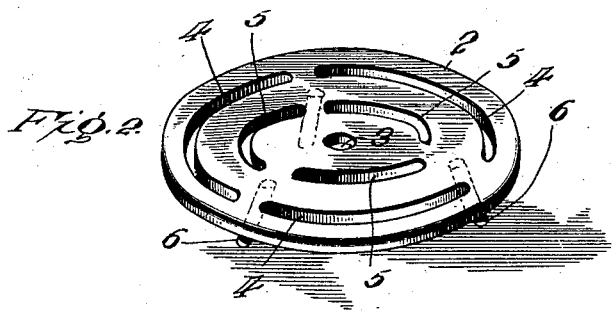
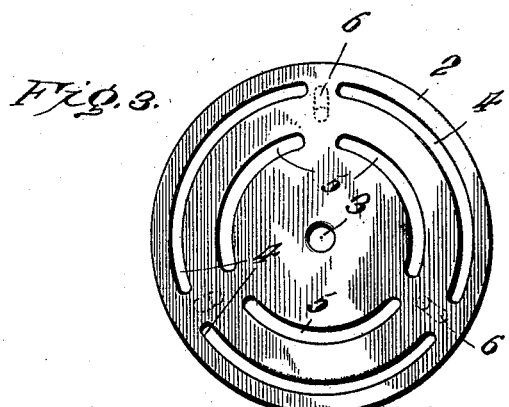
Witnesses
L. O. Langworthy
L. H. Schmidt
Inventor
Mary Ella Roberts
By Watson E. Coleman
Attorney

UNITED STATES PATENT OFFICE.

MARY ELLA ROBERTS, OF DAWSON, NORTH DAKOTA.

DISH-DRAINER.

No. 842,703.     Specification of Letters Patent.     Patented Jan. 29, 1907.

Application filed August 29, 1905. Serial No. 276,199.

*To all whom it may concern:*

Be it known that I, MARY ELLA ROBERTS, a citizen of the United States, residing at Dawson, in the county of Kidder and State of North Dakota, have invented certain new and useful Improvements in Dish-Drainers, of which the following is a specification, reference being had therein to the accompanying drawings.

My invention relates to dish-drainers, and more particularly to that class adapted to be used in the interior of dish-pans, one of the objects being to provide a device of the character described that shall be simple and inexpensive in construction and effectual and convenient in operation.

Other objects and advantages of my invention, as well as the structural features by means of which these objects are attained, will be made clear by an examination of the specification, taken in connection with the accompanying drawings, in which the same reference-numerals indicate corresponding portions throughout, and in which—

Figure 1 is a cross-section showing a dish-pan and my drainer in operative position therein. Fig. 2 is a perspective view of the drainer, showing the supports in dotted lines; and Fig. 3 is a top plan, also showing the supports in dotted lines.

1 designates a dish-pan of the ordinary well-known construction, and 2 a circular disk or plate, which may be made of any suitable material, preferably galvanized tin to avoid rust, and having a concave upper surface, causing it to slope to the center thereof from all points. At the center is an opening 3, and concentric of the rim or outer edge of the disk 2 are curved slots or openings 4, and concentric of said slots or openings and at a suitable distance therefrom are other curved slots or openings 5, the objects of said central opening 3 and the curved slots or openings being to permit the water to escape from the surface of the disk and flow into the pan. The slots 4 and 5 also serve to engage the lower edges of the dishes when placed edgewise on the disk, thus avoiding the necessity of providing ribs or other projections which collect the dirt and make the drainer hard to clean. The disk is supported by the legs or supports 6, of which there may be any desired number.

In operation the drainer is placed in the pan, different sizes being constructed to fit pans of different capacities, as shown in Fig. 1, with the legs or supports 6 resting on the bottom of the pan. The dishes are then placed in the pan and rest upon the circular disk or plate 2. As the upper surface of this disk or plate is concave, the water dripping from the dishes immediately passes through the curved slots or openings 4 and 5 or through the central opening 3 into the bottom of the pan.

Having thus described my said invention, what I claim as new, and desire to secure by Letters Patent of the United States, is—

1. A dish-drainer comprising a rimless concavo-convex disk having a smooth upper and a smooth lower face, a central opening, arcuate slots concentric with the opening, and a support for the disk.

2. A dish-drainer comprising a rimless concavo-convex disk having a smooth upper and a smooth lower face, arcuate slots concentrically arranged, and a support for the disk.

In testimony whereof I hereunto affix my signature in presence of two witnesses.

MARY ELLA ROBERTS.

Witnesses:
    GEORGE S. ROBERTS,
    JESSIE ROBERTS.